United States Patent
Hieida et al.

(10) Patent No.: US 10,705,184 B2
(45) Date of Patent: Jul. 7, 2020

(54) SENSOR CALIBRATION SYSTEM

(71) Applicant: Hitachi, Ltd., Chiyoda-ku, Tokyo (JP)

(72) Inventors: Yusuke Hieida, Tokyo (JP); Takuya Naka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 15/779,676

(22) PCT Filed: Sep. 7, 2016

(86) PCT No.: PCT/JP2016/076224
§ 371 (c)(1),
(2) Date: May 29, 2018

(87) PCT Pub. No.: WO2017/149813
PCT Pub. Date: Sep. 8, 2017

(65) Prior Publication Data
US 2018/0372841 A1 Dec. 27, 2018

(30) Foreign Application Priority Data

Feb. 29, 2016 (JP) .................................. 2016-036563

(51) Int. Cl.
*G01S 7/40* (2006.01)
*G05D 1/02* (2020.01)
(Continued)

(52) U.S. Cl.
CPC ................ *G01S 7/40* (2013.01); *G01S 13/86* (2013.01); *G01S 13/874* (2013.01); *G01S 13/89* (2013.01);
(Continued)

(58) Field of Classification Search
CPC ........................................................ G01S 7/40
See application file for complete search history.

(56) References Cited

U.S. PATENT DOCUMENTS

2010/0256940 A1* 10/2010 Ogawa .................. G01S 7/4812
702/97
2011/0122257 A1* 5/2011 Kirk ....................... G01C 11/06
348/187

FOREIGN PATENT DOCUMENTS

JP 2010-151682 A 7/2010
JP 2010-249613 A 11/2010
(Continued)

OTHER PUBLICATIONS

International Search Report (PCT/ISA/210) issued in PCT Application No. PCT/JP2016/076224 dated Nov. 15, 2016 with English translation (seven pages).
(Continued)

*Primary Examiner* — Manuel A Rivera Vargas
(74) *Attorney, Agent, or Firm* — Crowell & Moring LLP

(57) ABSTRACT

When a combination of a plurality of sensors is used for obstacle detection, the present invention is to detect the relative positions of the sensors, to correct inter-sensor parameters, and to provide accurate obstacle detection. This calibration system is provided with a first landmark detecting unit for detecting the position of a first landmark from three-dimensional shape information; a landmark associating unit for determining a correspondence relation, between the first landmark position detected by the first landmark detecting unit and an attachment position to the vehicle of the first landmark estimated by a vehicle landmark relative position estimating unit; and a vehicle sensor relative orientation estimating unit for estimating the relative position and orientation of the vehicle and a first measurement section based on the information from the vehicle landmark relative position estimating unit and a landmark associating unit.

2 Claims, 7 Drawing Sheets

(51) Int. Cl.
    *G01S 13/89*         (2006.01)
    *G01S 13/87*         (2006.01)
    *G08G 1/16*          (2006.01)
    *G01S 13/86*         (2006.01)
    *G01S 13/931*       (2020.01)

(52) U.S. Cl.
    CPC .............. *G01S 13/931* (2013.01); *G05D 1/02* (2013.01); *G05D 1/0234* (2013.01); *G08G 1/16* (2013.01); *G01S 13/862* (2013.01); *G01S 13/865* (2013.01); *G01S 13/867* (2013.01); *G01S 2007/4091* (2013.01); *G01S 2013/9322* (2020.01); *G01S 2013/9323* (2020.01); *G01S 2013/9324* (2020.01); *G01S 2013/9329* (2020.01); *G01S 2013/93271* (2020.01); *G01S 2013/93274* (2020.01); *G08G 1/165* (2013.01)

(56)            References Cited

FOREIGN PATENT DOCUMENTS

| | | | |
|---|---|---|---|
| JP | 2013-79816 A | | 5/2013 |
| JP | 2014-153211 A | | 8/2014 |
| JP | 5819555 B1 | | 11/2015 |

OTHER PUBLICATIONS

Japanese-language Written Opinion (PCT/ISA/237) issued in PCT Application No. PCT/JP2016/076224 dated Nov. 15, 2016 (eight pages).

\* cited by examiner

[FIG. 1]
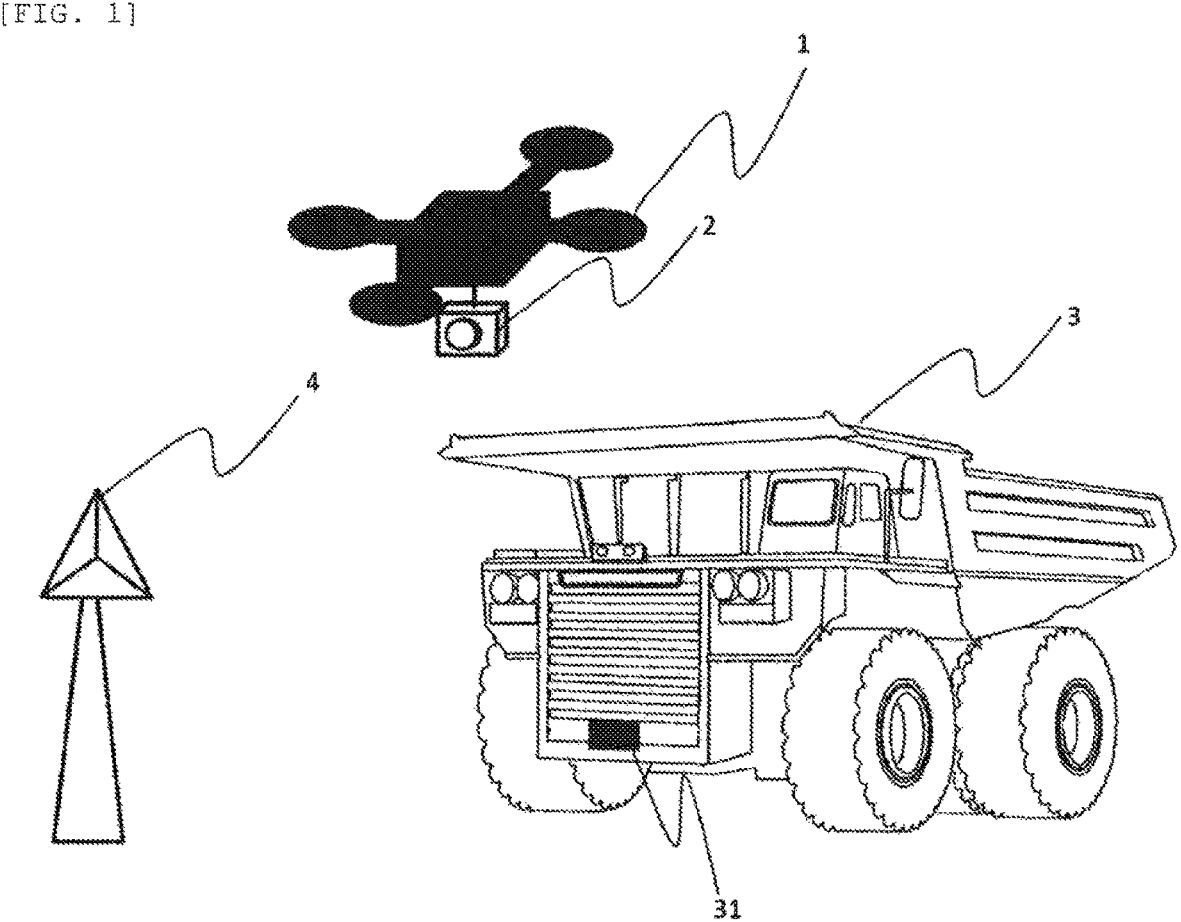

[FIG. 2]
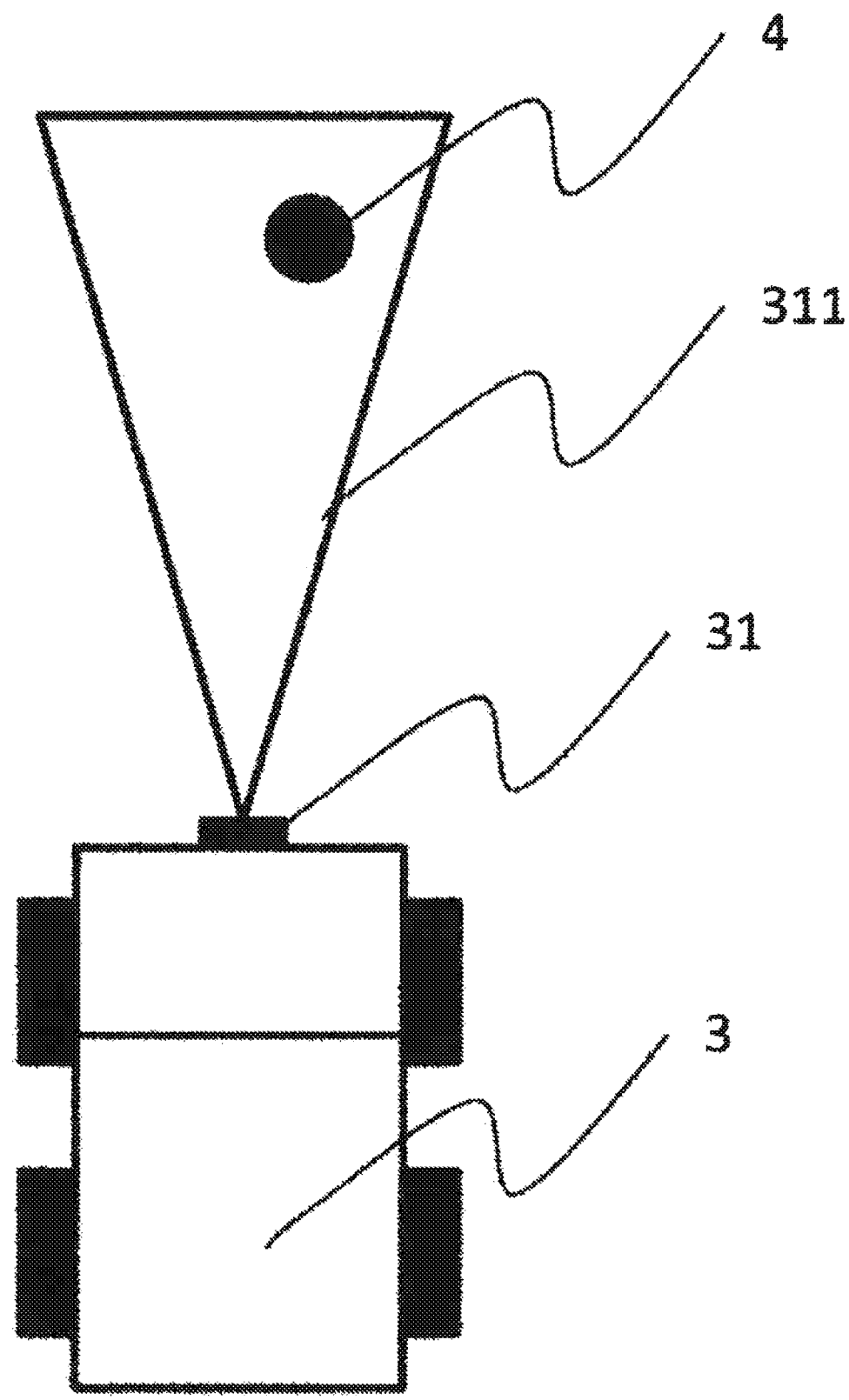

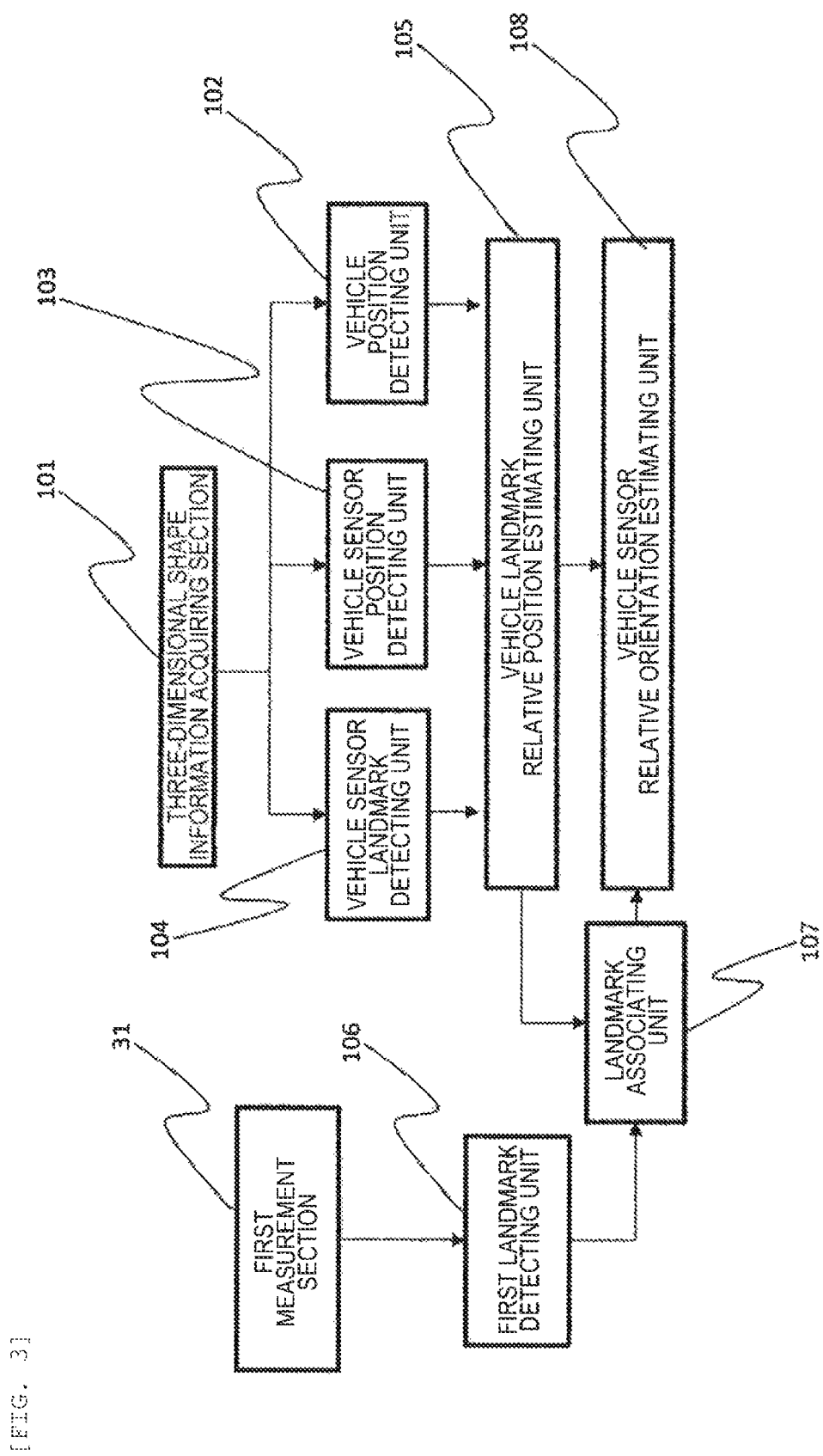
[FIG. 3]

[FIG. 4]
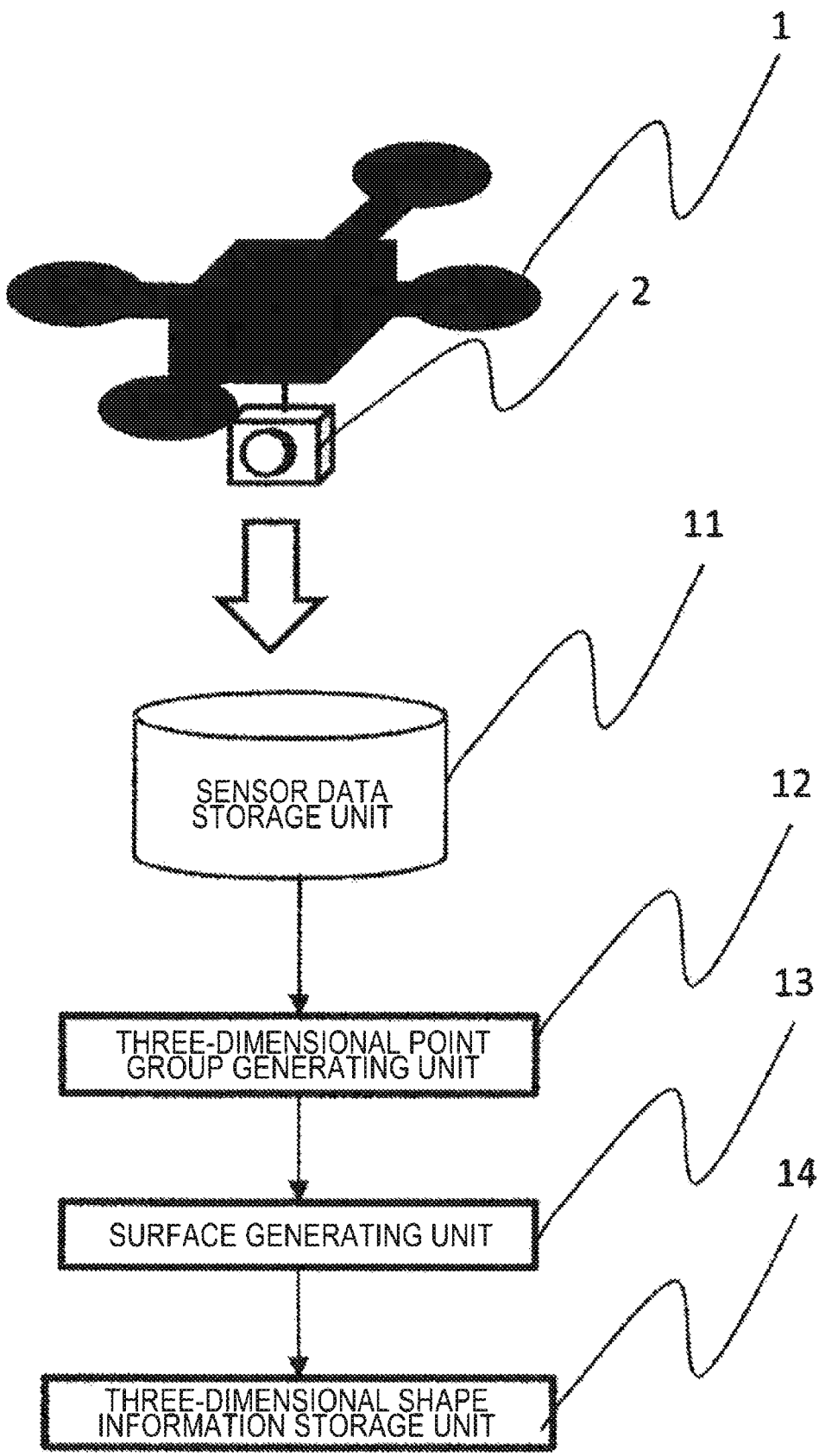

[FIG. 5]
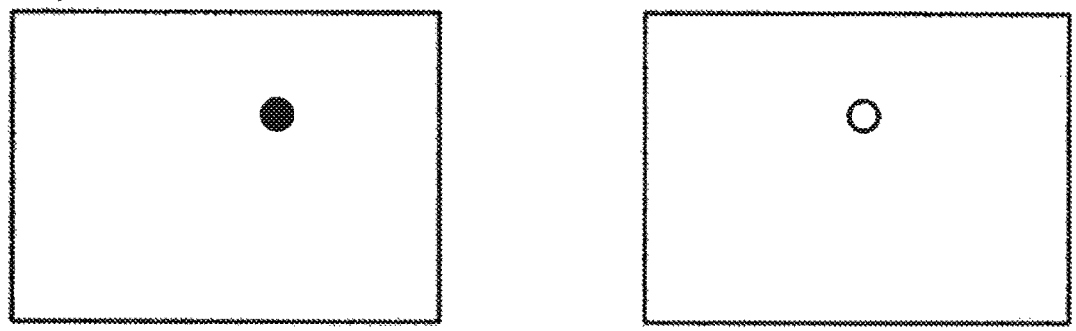
RELATIVE POSITION INFORMATION
BETWEEN SENSOR AND LANDMARK
DETECTED BY 106
RELATIVE POSITION INFORMATION
BETWEEN SENSOR AND LANDMARK
ESTIMATED BY 105
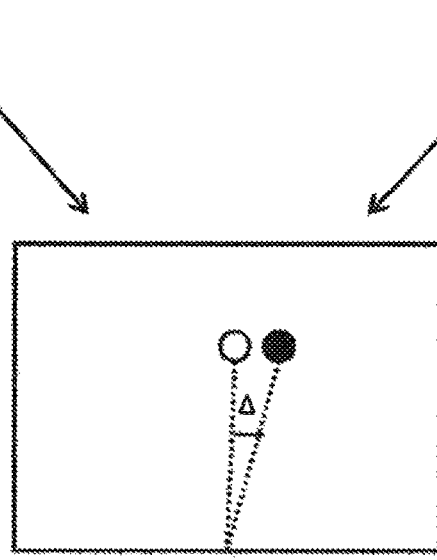

[FIG. 6]
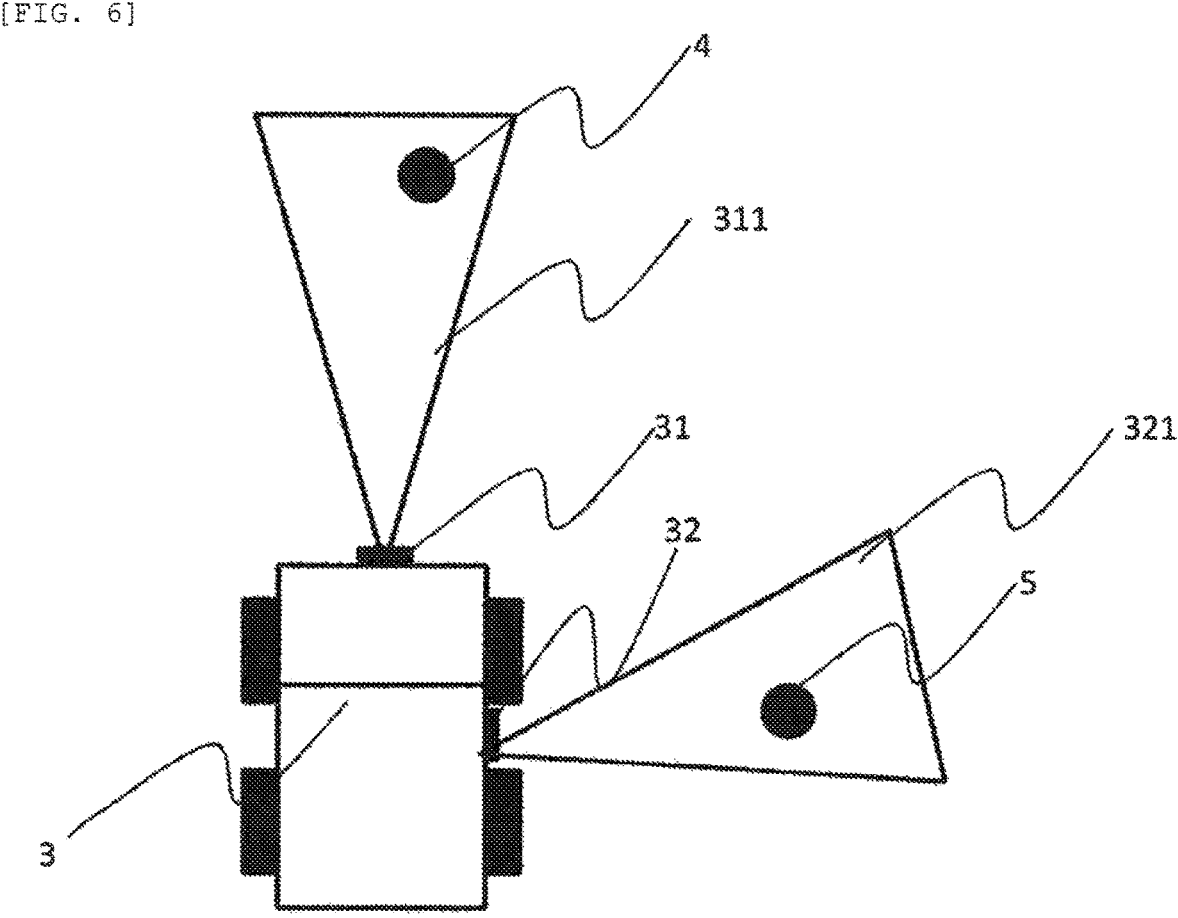

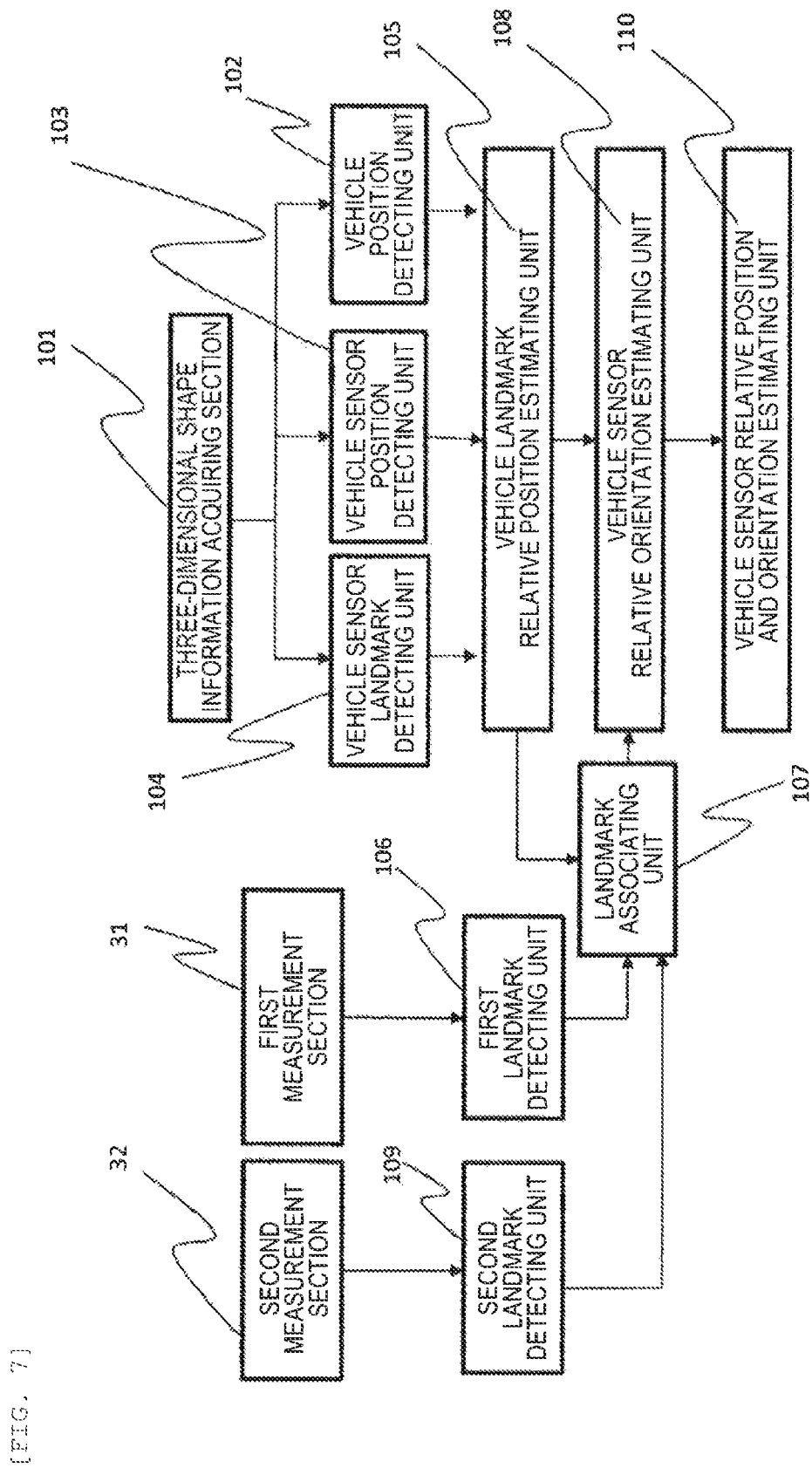
[FIG. 7]

SENSOR CALIBRATION SYSTEM

TECHNICAL FIELD

The present invention relates to an inter-sensor calibration system for autonomous traveling vehicles, for example.

BACKGROUND ART

Generally in mines, mining work machines such as hydraulic shovels and dump trucks are used for excavation work and transportation work of earth and sand. For the mining work machines used at mines, an unmanned operation is required from the viewpoint of safety and cost reduction. In the dump truck, because the amount of earth and sand transported per unit time is directly related to the degree of progress of mining, an efficient operation is required. Therefore, in order to transport a large amount of earth and sand efficiently to the outside of the mining site, a mining system which uses an autonomous dump truck capable of performing a continuous operation has been required.

However, since a traveling road at a mine through which a dump truck travels is an off-road and there are many rough roads, when causing a dump truck to autonomously travel and perform an unmanned operation, there is a risk of a collision with an obstacle such as a mud wall or another vehicle. if an obstacle exists on the traveling road and an autonomous traveling unmanned dump truck comes into contact with the obstacle and stops, the operation of the mine is stopped for a long time. Therefore, in order to improve the reliability of the autonomous traveling dump truck, there is a need for an obstacle detection system having high reliability which is capable of detecting a preceding vehicle or the obstacles on the traveling road in the early stage, thereby performing the following travel to the preceding vehicle or the avoiding travel to the obstacle.

In related art, an obstacle detection apparatus such as a millimeter wave radar, a laser sensor, a camera, and a stereo camera is used as this kind of preceding vehicle and obstacle detection system. The millimeter wave radar has high environmental resistance to operate even when dust, rain, or the like occurs, and has high measurement range performance. Meanwhile, since the stereo camera or the laser sensor can measure a three-dimensional shape, it is possible to accurately detect an obstacle on the road. There is also a method of improving the obstacle detection performance by combining these sensors.

In order to use a plurality of sensors of different types, it is necessary to accurately grasp the relative position of each sensor. Especially, when attaching the sensors to a mining dump truck, since the car body is large, it is necessary to consider positional deviation due to aging in addition to the calibration at the time of attachment. For example, PTL 1 discloses an obstacle recognition device that corrects the axial deviation of an in-vehicle camera and an in-vehicle radar caused due to aging, based on position information of an obstacle detected by each sensor.

CITATION LIST

Patent Literature

PTL 1: JP-A-2010-249613

SUMMARY OF INVENTION

Technical Problem

However, since this method is based on the premise that most of the measurement regions of the sensor are superimposed, it is difficult to perform calibration, for example, with a sensor attached toward the front of the vehicle and a sensor attached toward the rear.

In the inter-sensor calibration of such a sensor in which the measurement regions are not superimposed or only partly superimposed, a landmark for calibration is installed having high accuracy and a large size capable of being measured in the measurement regions of all the sensors in the factory during production, or a landmark for calibration is installed in which a plurality of geometrical positional relations are found with high accuracy, and the installation position and the angle of the sensors are often determined from the measurement result of the sensors to perform calibration between the sensors.

However, for example, large-sized vehicles such as mining dump trucks are mostly assembled on site, the work is often performed off-road outdoors where the ground is not sufficiently leveled, and it is difficult to install landmarks for calibration with high accuracy. Further, under such circumstances, since the relative position of the landmark for calibration is measured manually, it depends on the skill of the measurer, and as a result, it was difficult to perform the calibration between sensors with sufficient accuracy.

The present invention has been made in view of the above problems, and an object thereof is to provide accurate obstacle detection by detecting a relative position between sensors and correcting a parameter between the sensors, even when performing the obstacle detection by combining a plurality of sensors.

Solution to Problem

The features of the present invention for solving the above problems are as follows, for example.

According to the invention, there is provided a calibration system which determines a relative position and orientation between a vehicle and an attachment position of a first measurement section attached to the vehicle, the calibration system including: a three-dimensional shape information acquiring section 101 which acquires three-dimensional shape information of the vehicle, a first landmark, and an environment around the first landmark; a vehicle sensor landmark position detecting unit 104 which estimates a position of the first landmark from the three-dimensional shape information; a vehicle sensor position detecting unit 103 which obtains an attachment position of the first measurement section to the vehicle from the three-dimensional shape information; a vehicle position detecting unit 102 which estimates a position of the vehicle from the three-dimensional shape information; a vehicle landmark relative position estimating unit 105 which obtains a relative position between the position of the vehicle and an installation position of the first measurement section; a first landmark detecting unit 106 which detects a position of the first landmark from the three-dimensional shape information; a landmark associating unit 107 which obtains a correspondence relation between the position of the first landmark detected by the first landmark detecting unit 106 and an attachment position of the first landmark on the vehicle estimated by the vehicle landmark relative position estimating unit 105; and a vehicle sensor relative orientation estimating unit 108 which estimates a relative position and orientation between the vehicle and the first measurement section, based on the information of the vehicle landmark relative position estimating unit 105 and the landmark associating unit 107.

Advantageous Effects of Invention

According to the present invention, it is possible to provide the accurate obstacle detection, by detecting the relative position between the sensors and correcting the parameters between the sensors, when the obstacle detection is performed by combining a plurality of sensors. The problems, configurations and effects other than those described above will be clarified by the description of the embodiments below.

BRIEF DESCRIPTION OF DRAWINGS

FIG. 1 is a view illustrating an example of an embodiment of the present invention FIG. 2 is a view illustrating a situation in which the embodiment of the present invention is applied in a bird's eye view.

FIG. 3 is a diagram illustrating a configuration of the embodiment of the present invention.

FIG. 4 is a diagram illustrating an example of a principle of a three-dimensional information measurement unit.

FIG. 5 is a diagram for explaining an operation of a vehicle sensor relative orientation estimating unit.

FIG. 6 is a view illustrating a situation to which the embodiment of the present invention is applied in a bird's eye view.

FIG. 7 is a diagram illustrating a configuration of the embodiment of the present invention.

DESCRIPTION OF EMBODIMENTS

Hereinafter, embodiments of the present invention will be described with reference to the drawings and the like. The following explanation illustrates specific examples of the contents of the present invention, and the present invention is not limited to these descriptions, and various changes and modifications by those skilled in the art within the scope of the technical idea disclosed in this specification are possible. Further, in all the drawings for explaining the present invention, those having the same function will be denoted by the same reference numerals, and the repetitive description thereof may be omitted.

Example 1

In this embodiment, an embodiment is for obtaining the relative position and orientation of the sensor position attached to the vehicle and the sensor vehicle position of the vehicle position.

FIG. 1 is a view illustrating an example of a scene utilizing this embodiment. The relative position and the orientation between the vehicle 3 and the attachment position of the first measurement section 31 attached to the vehicle 3 are obtained. At this time, it is assumed that the first measurement section 31 uses an external sensor capable of detecting the position of an arbitrary obstacle such as a millimeter wave radar, a Lidar, a camera, a stereo camera, and a TOF sensor. In the present embodiment, a first landmark 4 is installed in a measuring range 311 of the first measurement section. A view illustrating this situation in a bird's-eye view is illustrated in FIG. 2.

At this time, it is desirable that the first landmark 4 can be easily measured by the first measurement section 31. Subsequently, in this embodiment, by measuring the three-dimensional shape of the environment (the environment of the vehicle 3, the first landmark 4, and around the first landmark 4) including the vehicle 3 and the surrounding first landmark 4, the calibration between vehicle sensors is attained. The three-dimensional point group information and the three-dimensional surface information are herein referred to as three-dimensional shape information. At this time, as a method for measuring the three-dimensional shape, for example, a method for attaching an external sensor 2 such as a camera and Lidar to the unmanned aerial vehicle 1 as illustrated in FIG. 1, etc. is considered, but as long as it is possible to acquire a three-dimensional shape of the environment, this configuration is not limited.

Subsequently, the outline of this embodiment is illustrated in FIG. 3. In this embodiment, first, in order to obtain the relative position between the vehicle 3 and the first measurement section 31, the shape of the three-dimensional shape of the environment including the vehicle 3, the first measurement section. 31 and the first landmark 4 is measured by the three-dimensional shape information acquiring section 101. At this time, the three-dimensional shape information is obtained by attaching and measuring the sensors capable of obtaining the brightness, color information, temperature information of the shape or environment of the camera, the LIDAR, the millimeter wave radar, the ultrasonic sensor, and similar environments on an aircraft such as an unmanned aerial vehicle, a manned aircraft and a satellite. However, this configuration is not limited as long as three-dimensional shape information can be acquired.

As an example, FIG. 4 illustrates a configuration of a three-dimensional shape acquisition method by a monocular camera as an external sensor 2 attached to the unmanned aerial vehicle 1. At this time, the monocular camera can be an infrared camera or a far infrared camera, in addition to a camera capable of measuring visible light.

In this configuration, first, the monocular camera is attached to the unmanned aerial vehicle 1, and the unmanned aerial vehicle 1 is made to fly above the place where the environment map is to be created. At this time, continuous shooting is performed with a monocular camera. At this time, it is desirable to photograph so that the front and rear of the captured image overlaps around 80% of the captured image and the side thereof overlaps around 60% of the captured image. The captured image group is stored in the sensor data storage unit 11. By using Structure from Motion (SfM) and Multi View Stereo (MVS) in the three-dimensional point group generating unit 12 using this image group, three-dimensional point group information of the environment can be obtained. Based on the three-dimensional point group information, this is meshed by the surface generating unit 13 to generate three-dimensional surface information having texture information and normal vector information of the surface. The three-dimensional shape information is stored in the three-dimensional shape information storage unit 14. Since these techniques are well-known techniques, they are omitted here.

Subsequently, by utilizing the vehicle 3 obtained by using the three-dimensional shape information acquiring section 101, the first measurement section 31, the first landmark 4 and the three-dimensional shape information having surrounding environment information, the vehicle position detecting unit 102 detects the vehicle position of the vehicle 3. As a method for detecting the vehicle position of the vehicle 3, for example, shape information or image information of the front, rear, left and right wheels of the vehicle are registered in advance, from the measured three-dimensional shape information, by matching of image local feature points represented by the template matching processing, the SIFT feature, and SURF feature, the corresponding portion is searched, and the vehicle position of the vehicle 3 is specified. At this time, markers such as a color and a shape characteristic to the vehicle may be attached to the vehicle in order to facilitate searching.

Subsequently, the vehicle sensor position detecting unit 103 detects the installation position (attachment position to the vehicle 3) of the first measurement section 31 from the three-dimensional shape information acquired by the three-dimensional shape information acquiring section 101. As a method for detecting the position of the first measurement section 31, for example, shape information or image information of the first measurement section 31 is registered in advance, and by matching of image local feature points represented by template matching processing, SIFT feature, SURF feature from the measured three-dimensional shape information, the corresponding location is searched, and the installation position of the first measurement section 31 is specified. At this time, a marker having a characteristic color or shape may be attached to the landmark so as to facilitate the search.

Subsequently, the vehicle sensor landmark detecting unit 104 detects the position of the first landmark 4 for the vehicle sensor from the three-dimensional shape information acquired by the three-dimensional shape information acquiring section 101. As a method for detecting the position of the first landmark 4, for example, shape information or image information of the first landmark 4 is registered in advance, and the corresponding place is searched by matching of the image local feature points represented by the template matching processing, the SIFT features, and the SURF features from the measured three-dimensional shape information, and the position of the first landmark 4 is specified. At this time, a marker having a characteristic color or shape may be attached to the landmark so as to facilitate the search.

Based on the position information of each target detected by the vehicle position detecting unit 102, the vehicle sensor position detecting unit 103, and the vehicle sensor landmark detecting unit 104, the vehicle landmark relative position estimating unit 105 obtains the relative position of the vehicle position of the vehicle 3 and the installation position of the first measurement section 31. At this time, as a method for obtaining the relative position, since the three-dimensional shape information acquiring section 101 has the vehicle 3 and the first landmark 4 and the surrounding environment as three-dimensional shape information, and obtains the position of each target from the information, the relative position is obvious.

Subsequently, from the information measured by the first measurement section 31, the position of the first landmark 4 within the measurement region is detected in the first landmark detecting unit 106. As a method for detecting the position of the first landmark 4, for example, shape information or image information of the first landmark 4 is registered in advance, and by matching of the image local feature points represented by the template matching processing, the SIFT features, the SURF features, etc. from the measured three-dimensional shape information, the corresponding place is searched, and the position of the first landmark 4 is specified. At this time, a marker having a characteristic color or shape may be attached to the landmark so as to facilitate the search. Alternatively, there is a method for making the first landmark 4 characteristic to the environment, when the first measurement section 31 corresponds to a millimeter wave sensor, Lidar or the like, for example, by utilizing a material having a high reflection intensity as the material of the landmark for the first measurement section 31, thereby enhancing the reflection intensity of the first landmark 4.

Subsequently, in a landmark associating unit 107, the landmark position information detected by the first landmark detecting unit 106 is compared with the position of the landmark estimated by the vehicle landmark relative position estimating unit 105. In regard to the relative position of the first landmark 4 estimated by the first landmark detecting unit 106, when the relative position of the first landmark 4 estimated by the vehicle landmark relative position estimating unit 105 is within a preset threshold value, it is determined that the respective detection results detect the same landmark.

In the vehicle sensor relative orientation estimating unit 108, the relative orientation of the vehicle sensor (the relative position and orientation between the vehicle 3 and the first measurement section 31) is estimated, based on the information of the vehicle landmark relative position estimating unit 105 and the landmark associating unit 107.

FIG. 5 is a diagram illustrating the operation of the vehicle sensor relative orientation estimating unit 108. A right top view illustrates the position of the first landmark 4 based on the first measurement section 31 detected by the vehicle landmark relative position estimating unit 105 in an overhead view, and a left top view illustrates the relative position information of the landmark detected by the first landmark detecting unit 106 in an overhead view. This is represented by the coordinate system centered on the installation position of the first measurement section 31, and the superimposed ones are the lower diagram of FIG. 5. The installation position of the first measurement section 31 and the position of the first landmark 4 detected and estimated by the first measurement section 31 are connected, and the installation orientation of the first measurement section 31 is determined based on how much the angle is different.

Thus, the relative position between the first measurement section 31 and the vehicle 3 can be obtained. That is, in the sensor calibration system according to the present embodiment, by the three-dimensional shape information acquiring section using, for example, UAV or the like, the position and shape of the landmark for calibration are accurately measured and the vehicle position is estimated. Accordingly, it is possible to highly accurately estimate and correct the inter-sensor position with high accuracy and the position between the sensor vehicles under any circumstances. This makes it possible to soundly operate the obstacle detection system using the sensor.

Further, there may be a recommended sensor installation position presentation unit for presenting the installation position orientation of the vehicle sensor designated in advance or the difference position orientation thereof to the user, in the case where the measured installation position of the vehicle sensor and the vehicle body are greatly different from the installation position of the vehicle sensor designated in advance.

Example 2

The present embodiment is an embodiment aimed at obtaining the relative position of a plurality of sensors attached to a vehicle. FIG. 6 illustrates an example in which the first measurement section 31 and the second measurement section 32 are attached. The relative position and orientation of the first measurement section 31 and the second measurement section 32 attached to the vehicle 3 are obtained. At this time, it is assumed that the first measurement section and the second measurement section use an external sensor capable of detecting the position of an arbitrary obstacle such as a millimeter wave radar, a Lidar, a camera, a stereo camera, and a TOF sensor.

At this time, there is no problem even if the first measurement section 31 and the second measurement section 32 are of different types of external sensors. In the present embodiment, the first landmark 4 is installed, in the measuring range 311 of the first measurement section, and the second landmark 5 is installed in the measuring range 321 of the second measurement section. FIG. 6 illustrates this situation in a bird's-eye view. At this time, it is desirable that the first landmark 4 can be easily measured by the first measurement section 31, and it is desirable that the second landmark 5 can be easily measured by the second measurement section 32. In addition, these landmarks can also be substituted if there are surrounding topographical shapes, trees, installations, etc.

FIG. 7 illustrates an outline of this embodiments. This embodiment is different from the first embodiment in that the second measurement section 32, the second landmark detecting unit 109 and the vehicle sensor relative position and orientation estimating unit 110 are added.

The second measurement section 32 and the second landmark detecting unit 109 operate in substantially the same manner as the first measurement section 31 and the first landmark detecting unit 106 described in the first embodiment.

The vehicle sensor relative position and orientation estimating unit 110 geometrically obtains the relative position and orientation of the first measurement section 31 and the second measurement section 32, from the relative position and orientation of the first measurement section 31 and the vehicle 3 and the relative position and orientation of the second measurement section 32 and the vehicle 3 estimated by the vehicle sensor relative orientation estimating unit 108.

REFERENCE SIGNS LIST

1: unmanned aerial vehicle
2: external sensor
3: vehicle
4: first landmark
5: second landmark
11: sensor data storage unit
12: three-dimensional point group generating unit
13: surface generating unit
14: three-dimensional shape information storage unit
31: first measurement section
32: second measurement section
101: three-dimensional shape information acquiring section
102: vehicle position detecting unit
103: vehicle sensor position detecting unit
101: vehicle sensor landmark detecting unit
105: vehicle landmark relative position estimating unit
106: first landmark detecting unit
107: landmark associating unit
108: vehicle sensor relative orientation estimating unit
109: second landmark detecting unit
110: vehicle sensor relative position and orientation estimating unit
110, 311: measuring range of first measurement section
321: measuring range of second measurement section

The invention claimed is:

1. A calibration system which determines a relative position and orientation between a vehicle and an attachment position of a first measurement section attached to the vehicle, the calibration system comprising:
    a three-dimensional shape information acquiring section which acquires three-dimensional shape information of the vehicle, a first landmark, and an environment around the first landmark;
    a vehicle sensor landmark position detecting unit which estimates a position of the first landmark from the three-dimensional shape information;
    a vehicle sensor position detecting unit which obtains an attachment position of the first measurement section to the vehicle from the three-dimensional shape information;
    a vehicle position detecting unit which estimates a position of the vehicle from the three-dimensional shape information;
    a vehicle landmark relative position estimating unit which obtains a relative position between the position of the vehicle and an installation position of the first measurement section;
    a first landmark detecting unit which detects a position of the first landmark from the three-dimensional shape information;
    a landmark associating unit which obtains a correspondence relation between the position of the first landmark detected by the first landmark detecting unit and an attachment position of the first landmark on the vehicle estimated by the vehicle landmark relative position estimating unit; and
    a vehicle sensor relative orientation estimating unit which estimates a relative position and orientation between the vehicle and the first measurement section, based on the information of the vehicle landmark relative position estimating unit and the landmark associating unit.

2. The calibration system according to claim 1, wherein a second measurement section is attached to the vehicle, and
    the calibration system includes a vehicle sensor relative position and orientation estimating unit which obtains a relative position and orientation between the first measurement section and the second measurement section, based on the relative position and orientation between the vehicle and the first measurement section or the second measurement section obtained in the calibration system.

* * * * *